United States Patent
Bekele et al.

(10) Patent No.: US 12,451,972 B2
(45) Date of Patent: Oct. 21, 2025

(54) METHODS AND APPARATUSES FOR WAVELENGTH LOCKING FOR OPTICAL WAVELENGTH DIVISION MULTIPLEXED MICRO-RING MODULATORS

(71) Applicant: XILINX, INC., San Jose, CA (US)

(72) Inventors: Adebabay M. Bekele, San Jose, CA (US); Mayank Raj, San Jose, CA (US); Chuan Xie, Fremont, CA (US); Sandeep Kumar, Cork (IE); Zhaowen Wang, Sunnyvale, CA (US); Sukruth Pattanagiri Giriyappa, Bangalore (IN); Parag Upadhyaya, Los Gatos, CA (US); Yohan Frans, Palo Alto, CA (US)

(73) Assignee: XILINX, INC., San Jose, CA (US)

( * ) Notice: Subject to any disclaimer, the term of this patent is extended or adjusted under 35 U.S.C. 154(b) by 147 days.

(21) Appl. No.: 18/205,748

(22) Filed: Jun. 5, 2023

(65) Prior Publication Data
US 2024/0405882 A1 Dec. 5, 2024

(51) Int. Cl.
*H04B 10/04* (2006.01)
*H04B 10/54* (2013.01)

(52) U.S. Cl.
CPC ................................ *H04B 10/541* (2013.01)

(58) Field of Classification Search
CPC .. H04B 10/541; H04B 10/505; H04B 10/508; H04B 10/516; H04B 10/40;
(Continued)

(56) References Cited

U.S. PATENT DOCUMENTS 9,348,154 B2 * 5/2016 Hayakawa ............... G02F 1/225
11,005,572 B1 5/2021 Chiang et al.
(Continued)

FOREIGN PATENT DOCUMENTS

WO 2022155721 A1 7/2022

OTHER PUBLICATIONS

Xie, Chuan, "Micro Ring Modulators for 112Gbps PAM4 operation—A Feasibility Study", Xilinx, Jul. 2019.
(Continued)

*Primary Examiner* — Hanh Phan
(74) *Attorney, Agent, or Firm* — Patterson + Sheridan, LLP

(57) ABSTRACT

Some examples described herein provide for controlling output modulation amplitude for optoelectronic devices. In an example, a method includes transmitting a data pattern to an optical modulator device. The method also includes identifying, for each heater control value of a plurality of heater control values for a heater thermally coupled with the optical modulator device, an optical modulation amplitude corresponding to the heater control value based on a corresponding photodiode current value identified while transmitting the data pattern. The method also includes determining a maximum optical modulation amplitude for the optical modulator device based on a plurality of optical modulation amplitudes corresponding to the plurality of heater control values according to the identifying. The method also includes controlling the heater based at least in part on the determined maximum optical modulation amplitude that has been modified according to scaling maximum photodiode current values.

20 Claims, 6 Drawing Sheets

(58) Field of Classification Search
CPC ............ H04B 10/0795; H04B 10/5059; H04B 10/50593; H04B 10/50595; H04B 10/50572; H04B 10/50577; H04B 10/50575; H04B 10/50577; H04J 14/0283; G02B 6/29341; G02B 6/29338; G02F 1/025
USPC ....... 398/183, 188, 186, 187, 192, 193, 194, 398/195, 196, 197, 198, 199, 200, 201, 398/135, 136, 158, 159, 33, 38, 79, 25, 398/26, 27
See application file for complete search history.

(56) References Cited

U.S. PATENT DOCUMENTS

| | | | | |
|---|---|---|---|---|
| 11,139,907 | B2 * | 10/2021 | Melikyan | ............. H04B 1/1027 |
| 12,009,912 | B2 * | 6/2024 | Lin | ...................... H04B 10/506 |
| 2011/0058765 | A1 | 3/2011 | Xu | |
| 2014/0193113 | A1 | 7/2014 | Akiyama | |
| 2015/0316794 | A1 | 11/2015 | Hayakawa | |
| 2016/0013865 | A1 | 1/2016 | Dutt et al. | |
| 2021/0341765 | A1 | 11/2021 | Lu et al. | |
| 2024/0396638 | A1 * | 11/2024 | Bekele | ................ H04B 10/505 |

OTHER PUBLICATIONS

K. Padmaraju et al., "Wavelength Locking and Thermally Stabilizing Microring Resonators Using Dithering Signals," IEEE Journal of Lightwave Technology, vol. 32, No. 3, Feb. 2014.

U.S. Appl. No. 18/128,948, filed Mar. 30, 2023 Entitled "Circuits and Methods for Wavelength Locking of Optical Receiver WDM Filters".

International Search Report and Written Opinion from PCT/US2024/032214 dated Sep. 10, 2024.

* cited by examiner

METHODS AND APPARATUSES FOR WAVELENGTH LOCKING FOR OPTICAL WAVELENGTH DIVISION MULTIPLEXED MICRO-RING MODULATORS

This invention was made with U.S. Government support under Agreement No. HR0011-19-3-0004, awarded by Defense Advanced Research Projects Agency. The U.S. Government has certain rights in the invention.

TECHNICAL FIELD

Examples of the present disclosure generally relate to controlling output modulation amplitude for optoelectronic devices, for example methods and apparatuses for wavelength locking for wavelength division multiplexed micro-ring modulators.

BACKGROUND

The growing demand of bandwidth in modern high-speed communication in conjunction with the slowing down of Moore's Law, requires new technology and innovative techniques in circuit design to meet current challenges in datacenters, supercomputers and other applications. Integrated high-speed silicon-photonics devices such as ring modulators, cascade ring resonators, and Zehnder Interferometers have the characteristics to meet this high bandwidth demand due to their energy efficient, and ability to be used in dense wavelength division multiplexing (WDM) systems. However, such integrated high-speed silicon-photonics devices may be highly sensitive to process and temperature variations, causing poor performance. For example, sensitivity of resonance wavelengths due to process variations and temperature drift results in transmission loss of the wanted optical signal amplitude. For at least these reasons, improved techniques for maximizing output modulation amplitude in optoelectronic devices are desired.

SUMMARY

Some examples described herein provide for controlling output modulation amplitude for optoelectronic devices, for example methods and apparatuses for wavelength locking for wavelength division multiplexed micro-ring modulators.

An example of the present disclosure is a method of operating an optoelectronic device. The method includes transmitting a data pattern to an optical modulator device of the optoelectronic device. The method also includes identifying, for each heater control value of a plurality of heater control values for a heater thermally coupled with the optical modulator device, an optical modulation amplitude corresponding to the heater control value based at least in part on a corresponding photodiode current value identified while transmitting the data pattern. The method also includes determining a maximum optical modulation amplitude for the optical modulator device based at least in part on a31 plurality of optical modulation amplitudes corresponding to the plurality of heater control values according to the identifying. The method also includes controlling the heater based at least in part on the determined maximum optical modulation amplitude that has been modified according to a scaling value.

Another example of the present disclosure is an optoelectronic device. The optoelectronic device includes an optical modulator device, a heater thermally coupled with the optical modulator device, a photodiode associated with the optical modulator device, and control circuitry coupled with the heater and the photodiode. The control circuitry is to transmit a data pattern to the optical modulator device. The control circuitry is also to identify, for each heater control value of a plurality of heater control values for the heater, an optical modulation amplitude corresponding to the heater control value based at least in part on a corresponding photodiode current value identified while transmitting the data pattern. The control circuitry is also to determine a maximum optical modulation amplitude for the optical modulator device based at least in part on a plurality of optical modulation amplitudes corresponding to the plurality of heater control values. The control circuitry is also to control the heater based at least in part on the determined maximum optical modulation amplitude that has been modified according to a scaling value.

Another example of the present disclosure is an integrated circuit device. The integrated circuit device includes a communications interface to couple the integrated circuit device with an optical modulator device, a heater, and a photodiode. The integrated circuit device also includes control circuitry coupled with the communications interface. The control circuitry is to transmit a data pattern to the optical modulator device via the communications interface. The control circuitry is also to identify, for each heater control value of a plurality of heater control values for the heater, an optical modulation amplitude corresponding to the heater control value based at least in part on a corresponding photodiode current value identified while transmitting the data pattern. The control circuitry is also to determine a maximum optical modulation amplitude for the optical modulator device based at least in part on a plurality of optical modulation amplitudes corresponding to the plurality of heater control values. The control circuitry is also to control, via the communications interface, the heater based at least in part on the determined maximum optical modulation amplitude that has been modified according to a scaling value.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
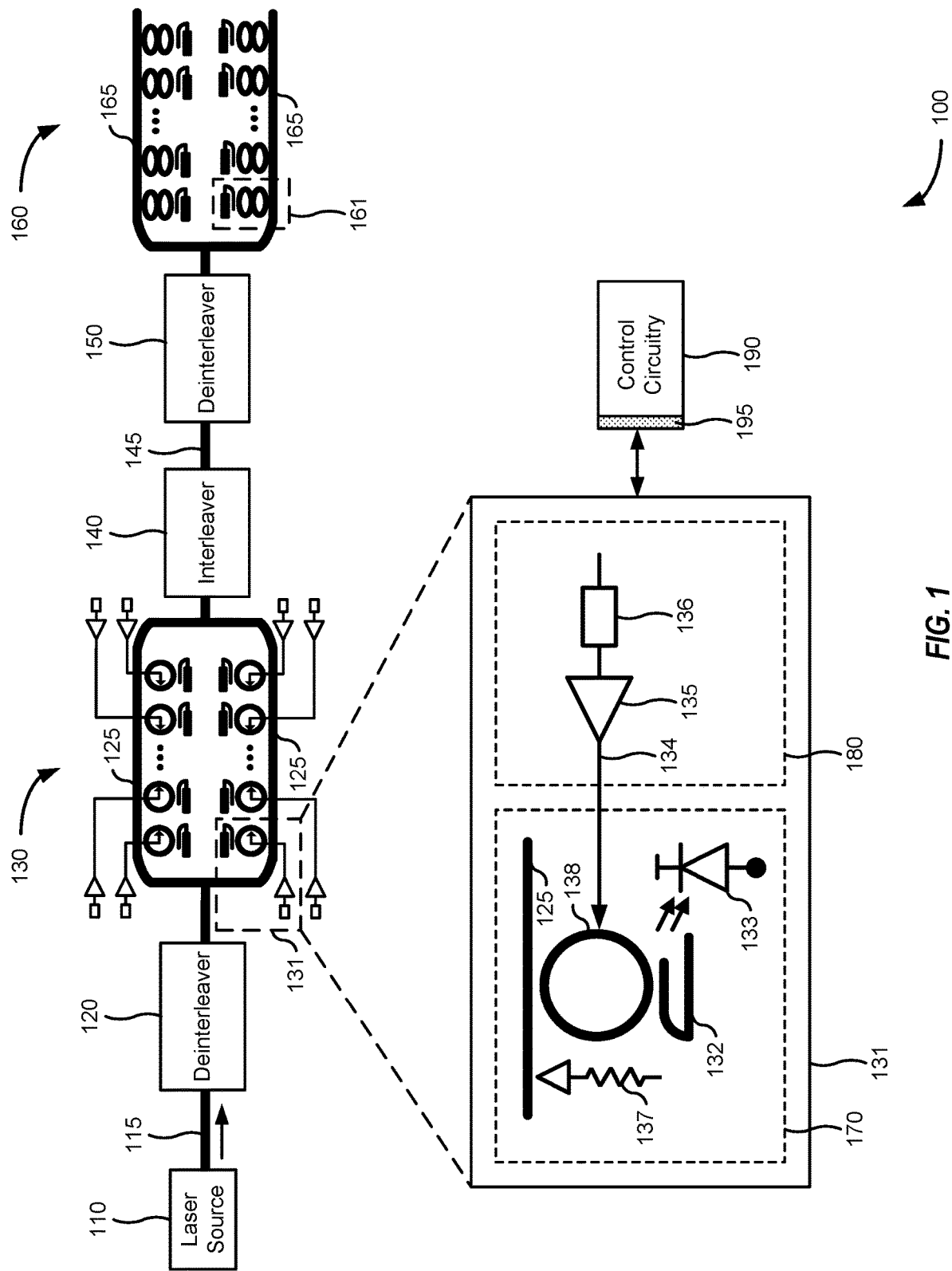
FIG. 1 is a block diagram depicting a photonic communications system, according to an example.

Some examples described herein provide for controlling output modulation amplitude for optoelectronic devices, for example methods and apparatuses for wavelength locking for wavelength division multiplexed micro-ring modulators (MRMs).

Integrated high-speed silicon-photonics devices may be highly sensitive to process and temperature variations, causing poor performance. For example, sensitivity of resonance wavelengths due to process variations and temperature drift results in transmission loss of the wanted optical signal amplitude in photonic or optoelectronic devices, including those containing optical modulation devices. Improved techniques for maximizing output modulation amplitude in optoelectronic devices are desired.

Methods and apparatuses for controlling output modulation amplitude for optoelectronic devices are disclosed. In one or more embodiments, temperature tracking techniques are disclosed, where control circuitry is used to determine a maximum optical modulation amplitude, then control a set of heaters for a set of optical modulator devices, each heater associated with one of the optical modulator devices. In some embodiments, the control circuitry operates to find the maximum optical modulation amplitude for an optoelectronic device. A maximum current for a photodiode is found, then scaled based on a scaling value (factor, ratio). The maximum optical modulation amplitude value is then determined based on the scaled maximum current. In some embodiments, the scaling value is predetermined or configured for the optoelectronic device. The heater associated with the optoelectronic device is then controlled during operation (mission mode) according to the scaled maximum optical modulation amplitude value.

The embodiments described herein provide advantages over existing techniques. One advantage includes that methods and apparatuses described herein have a relatively smaller footprint and load than current approaches (e.g., over sample-and-hold techniques). Another advantage includes implementation to provide for optical transceivers operating at high data rates, for example about 56 gigabits per second, or more. Another advantage includes compensating for process variations and temperature drift that can result in transmission loss of the wanted optical signal amplitude, and techniques described herein may have relatively lower thermal, process, and input power sensitivity than existing techniques. Another advantage is increased precision of control of the resonance wavelength of the optical modulator device, for example regardless of temperature and optical power variations experienced by the optical modulator device.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

FIG. 1 is a block diagram depicting a photonic communications system 100, according to an example. Photonic communications system 100 includes a laser source 110, a deinterleaver 120, a set of optical modulator blocks 130, an interleaver 140, a deinterleaver 150, and a set of optical demodulator blocks 160.

Laser source 110 generates carrier waves 115 (carrier signals), for example 4, 8, 16, or 32 carrier waves. Each carrier wave is associated with a particular wavelength ($\lambda$), which may be denoted $\lambda n$ for a particular carrier wave, where n=1, 2, 3, .... The carrier wave may additionally or alternatively be identified by its frequency (e.g., in gigahertz (GHz)). In one or more embodiments, the carrier waves have a regular wavelength or frequency separation (e.g., each carrier wave separated from the next carrier wave by 100 GHz).

Deinterleaver 120 separates carrier waves 115 into two or more sets of carrier waves 125. In one or more embodiments, deinterleaver 120 separates carrier waves 115 into two sets of carrier waves 125. In an example where carrier waves 115 includes sixteen individual carrier waves, each set of carrier waves can include eight carrier waves. For example, where carrier waves 115 include sixteen individual carrier waves each separated by 100 GHz, a first set of carrier waves 125 can include eight carrier waves, each separated by 200 GHz, and a second set of carrier waves 125 can include another eight carrier waves, each separated by 200 GHz. In one or more embodiments, deinterleaver 120 is a Mach-Zehnder interferometer based (MZI-based) deinterleaver.

The set of optical modulator blocks 130 receive the two or more sets of carrier waves 125. Each optical modulator block 131 of the set of optical modulator blocks 130 is configured to operate with one of the carrier waves of the carrier waves 115 generated by the laser source 110. For example, if there are thirty-two carrier waves in carrier wave 115, the set of optical modulator blocks 130 contains thirty-two of optical modulator blocks 131.

Each optical modulator block 131 includes an optical modulator device 138 thermally coupled with a heater 137, a drop-port 132 optically coupled with the optical modulator device 138 and a photodiode 133, a driver 135 to provide a drive signal 134 to the optical modulator device 138, and a digital signal source 136 to provide the digital signal used to drive the optical modulator device 138. Digital signal source 136 provides a signal (e.g., data) used to modulate the one of the carrier waves 115 associated with optical modulator block 131, such that following modulation of the carrier wave by the optical modulator block 131, the carrier wave will optically carry the signal provided by the digital signal source 136. The set of optical modulator blocks 130 will thus modulate the carrier waves 115 with a set of signals, each carrier wave carrying one of the signals of the set of signals, collectively a WDM signal.

In one or more embodiments, the optical modulator block 131 is divided into photonic circuitry 170 and electrical circuitry 180. For example, in some embodiments, the photonic circuitry 170 are at least a portion of one or more photonic integrated circuits and the electrical circuitry 180 are at least a portion of an electrical integrated circuit. In other embodiments, the photonic circuitry 170 and the electrical circuitry 180 are different portions of a single integrated circuit or different integrated circuits of a single integrated circuit system or assembly.

Each optical modulator block 131 is communicatively coupled with control circuitry 190, which may be or be referred to as a controller in some embodiments. In one or more embodiments, the control circuitry 190 is colocated with (e.g., on a same integrated circuit with, or within a same integrated system or assembly as) the electrical circuitry 180. In one or more embodiments, the control circuitry 190 is separate from the electrical circuitry 180 (e.g., on different integrated circuits, on different integrated systems or assemblies, or on different integrated circuits but within a same integrated system or assembly). In one or more embodiments, control circuitry 190 includes a communications interface 195 to send or receive signals as further described herein to one or more blocks or circuits of the photonic communications system 100.

Following the set of optical modulator blocks 130, the two or more sets of carrier waves 125 are received at interleaver 140, which combines the two or more sets of carrier waves 125 into a single WDM signal 145. In one or more embodiments, the carrier waves of the single WDM signal 145 have a regular wavelength or frequency separation (e.g., each carrier wave separated from the next carrier wave by 100 GHz). In one or more embodiments, the WDM signal 145 is carried by a waveguide, either on-chip or off-chip (e.g., between chips or assemblies). In some embodiments, the WDM signal 145 is carried by an on-chip waveguide of a photonic integrated circuit, for example, the on-chip waveguide of the photonic integrated circuit containing the photonic circuitry 170. In one or more embodiments, interleaver 140 is a Mach-Zehnder interferometer based (MZI-based) interleaver.

The WDM signal 145 is received at a deinterleaver 150 that separates the WDM signal 145 into two or more sets of modulated carrier waves 165. A set of optical demodulator blocks 160 demodulates the two or more sets of modulated carrier waves to extract the signals that were modulated onto the carrier waves at the set of optical modulator blocks 130.

As further described herein, one or more embodiments can be implemented in photonic communications system 100, including circuits (devices, including optoelectronic devices) and algorithms (methods, processes, operations or sets of operations) that increase or maximize a ring modulator output optical signal (e.g., an output optical signal for one or more optical modulator blocks 131) by controlling its temperature (e.g., via heater 137) and locking it to maximum optical modulation amplitude (OMA) for each transmitter lane (e.g., each carrier wave of carrier waves 115) for a WDM optical link (e.g., WDM signal 145). Examples of one or more embodiments can be implemented to provide for optical transceivers operating at high data rates, for example about 56 gigabits per second, or more. In one or more examples, the laser source 110, which is an external laser source in one or more embodiments, generates sixteen carrier waves, each carrier wave having a wavelength, λn, that resonates with a corresponding resource wavelength of an optical modulator device (e.g., an MRM resonance wavelength), for example an optical modulator device 138 of optical modulator block 131, that allows transmission and reception of about 1 terabyte of data, or more, for a 16-λ laser source.

In one or more embodiments, a resonance frequency of an optical modulator device (e.g., MRMs resonance frequency) depend on (e.g., are highly sensitive to) process and temperature variation. Sensitivity of resonance wavelength due to process variations and temperature drift can result in transmission loss of the wanted optical signal amplitude. For example, a resonance wavelength shift due to temperature variation can result in dramatically different transmitted eye diagram. One or more embodiments described herein avoid optical amplitude fluctuation due to thermal, process, and input power sensitivity, and increase the ability to be used in practical applications by allowing the determination and control (e.g., precise control) of a resonance wavelength of the optical modulator device, for example regardless of temperature and optical power variations experienced by the optical modulator device.

According to one or more temperature tracking techniques, a maximum Optical Modulation Amplitude (OMA) is calculated using sample-and-hold logic to integrate optical power when sending different data patterns. Although this approach can work, such approach has disadvantages. First, the transmission of data patterns (e.g., static signals, such as 1111 . . . or 0000 . . . ) to calculate a maximum OMA during calibration can cause self-heating of the optical modulator device. Such self-heating can cause different temperatures for the device (e.g., a photonic integrated circuit) containing the optical modulator device during calibration than for the device during an actual data transmission mode (e.g., during "mission mode"). Second, sample and hold circuit-based OMA calculation relies on several analog blocks such as comparators, capacitors, reference digital to analog converters (DACs), OTAs and offset cancellation circuits that are inherently large in their area usage. Third, prior techniques, including sample and hold architectures, are sensitive to input power range. If the laser power is low, then the OMA detection can become difficult due to low optical power having not enough time to charge the parasitic sampling capacitance. On the other hand, if the optical power is relatively large, a large programmable capacitance is needed to handle large optical power. Because there is not a mechanism to know the optical power at a given optical modulator device (e.g., at an MRM), choosing an appropriate sampling capacitance is difficult.

According to the techniques described herein, a maximum OMA can be determined at least in part by calibrating the DC behavior of an optical modulator device 138 (e.g., a ring modulator) and setting the resonance wavelength to a value where the modulation efficiency is determined to be at, about, or near the maximum OMA.

A drop-port power at a drop-port (e.g., drop-port 132) of an optical modulator device (e.g., optical modulator device 138) can be expressed by equation 1:

$$P_d = \frac{\beta \beta_d}{\Delta \omega^2 + \gamma^2} \text{ where } \gamma = \frac{1}{\tau} \text{ and } \beta = \mu^2; \quad (1)$$

μ signifies the coupling behavior between the bus (e.g., bus conveying the carrier wave of carrier waves 125) associated with the ring (e.g., optical modulator device 138); and τ is the photon lifetime in the ring. At a resonance (Δω=0), the peak power at drop-port is $$P_d^{pk} = \frac{\beta \beta_d}{\gamma^2}.$$

It can be shown that if the resonance of the ring (e.g., optical modulator device 138) is such that the laser wavelength (e.g., from laser source 110) is at the highest slope point of the resonance curve, then the OMA under modulation will be at maximum. The maximum slope, or the maximum optimal modulation efficiency point is at $$\Delta\omega = \frac{\gamma}{\sqrt{3}}$$

and the drop port power is calculated to be $$P_d = \frac{\beta\beta_d}{\frac{4}{3}\gamma^2} = \frac{3}{4}P_d^{pk}.$$

This implies that locking the DC power from the monitor port (e.g., drop-port 132) to ¾ of the peak power from the port will set the detuning to where the modulation efficiency is maximal. As such, to initiate locking, the ring is tuned across the resonance and $P_d^{pk}$ is extracted. As further discussed herein, methods and apparatuses are described that detect the peak power and lock the DC power from the peak, $K*P_d^{pk}$, where K is a predetermined (programmable, settable, configurable) ratio, and can be set to ¾ in one or more embodiments, for example according to the above calculation.

Figure 2:
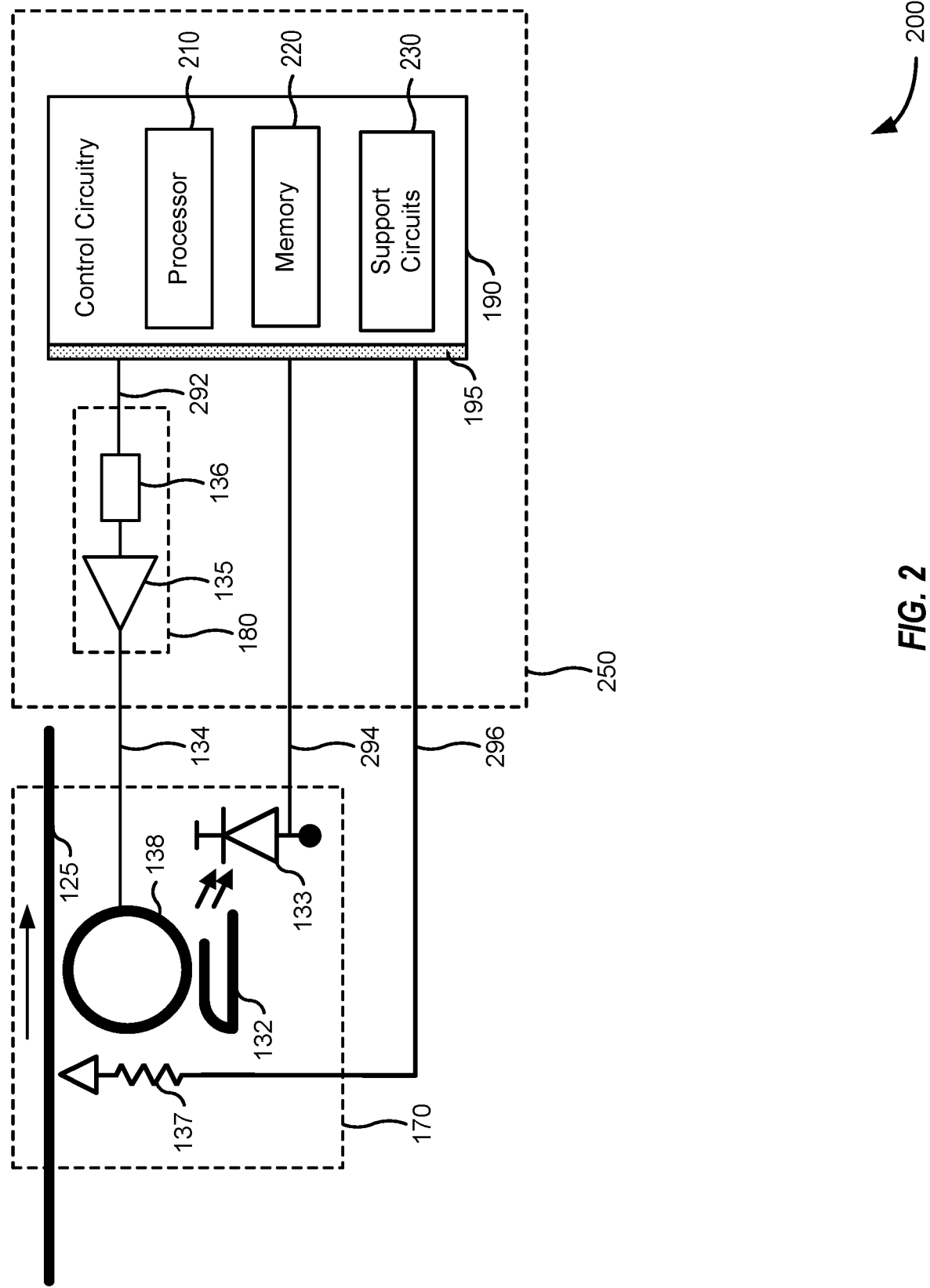
FIG. 2 is a block diagram depicting an optoelectronic device, according to an example.

FIG. 2 is a block diagram depicting an optoelectronic device 200, according to an example. In one or more embodiments, optoelectronic device 200 is an example of at least portions of photonic communications system 100. In one or more embodiments, the optoelectronic device 200 includes photonic circuitry 170 and electrical circuitry 250, which includes both electrical circuitry 180 and control circuitry 190. In one or more embodiments, one or more of the photonic circuitry 170, electrical circuitry 180, or control circuitry 190 are colocated (e.g., on a same integrated circuit with, or within a same integrated system or assembly). In other embodiments, one or more of the photonic circuitry 170, electrical circuitry 180, or control circuitry 190 are separate (e.g., on different integrated circuits, on different integrated systems or assemblies, or on different integrated circuits but within a same integrated system or assembly). In one or more embodiments, control circuitry 190 includes a communications interface 195 to send or receive signals as further described herein to one or more blocks or circuits of the optoelectronic device 200, including drive signal 134.

In one or more embodiments, control circuitry 190 of the optoelectronic device 200 includes a processor 210, a memory 220, and support circuits 230. In some embodiments, control circuitry 190 is or includes a DSP. Control circuitry 190, including one or more of the processor 210, memory 220, or support circuits 230 can perform one or more operations of methods described herein.

The processor 210 (e.g., DSP) is operable with memory 220 (e.g., non-volatile memory) and support circuits 230. The support circuits 230 (e.g., one or more cache, clock circuit, input/output subsystem, power supply (e.g., current source, voltage source), digital-to-analog converter (DAC) (e.g., current DAC (IDAC), voltage DAC (VDAC)), analog-to-digital converter (ADC), voltage controlled oscillator (VCO), multiplexer (MUX), demultiplexer (deMUX), flip-flop (FF), etc., and combinations thereof) are conventionally coupled to the processor 210 and coupled to the various other components of the optoelectronic device 200 or photonic communications system 100.

In one or more embodiments, the processor 210 is any circuitry sufficient to implement the features (processes, operations, methods) described herein, such as an application-specific integrated circuit (ASIC), a DSP, or a field-programmable gate array (FPGA) (e.g., an FPGA programmed according to register-transfer level (RTL) implementing features described herein). In some embodiments, the processor 210 is one of any form of general-purpose computer processor used in connection with optical communications equipment, such as a programmable logic controller (PLC), for controlling system components and sub-processors.

The memory 220, coupled to the processor 210, is non-transitory and is typically one or more of readily available memory such as random access memory (RAM), read only memory (ROM), floppy disk drive, hard disk, or any other form of digital storage, local or remote.

In one or more embodiments, the memory 220 is in the form of a computer-readable storage media containing instructions (e.g., non-volatile memory), that when executed by the processor 210, facilitates the operation of the optoelectronic device 200 or photonic communications system 100. The instructions in the memory 220 is in the form of a program product such as a program that implements the methods of the present disclosure (e.g., middleware application, equipment software application, etc.). The program code may conform to any one of a number of different programming languages. In one example, the disclosure may be implemented as a program product stored on computer-readable storage media for use with a computer system. The program(s) of the program product define functions of the embodiments (including the methods described herein).

Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are embodiments of the present disclosure.

Figure 3:
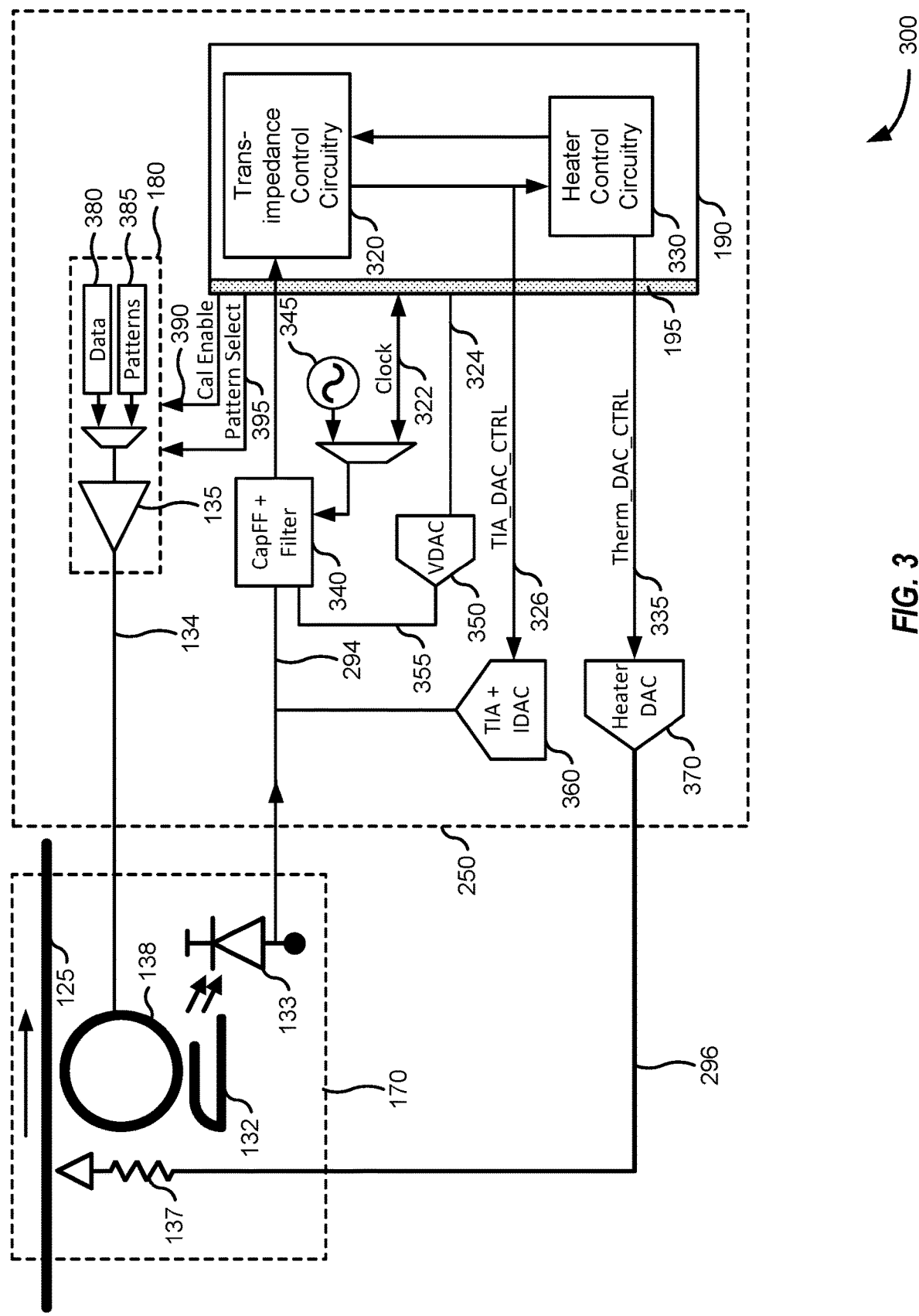
FIG. 3 is a block diagram depicting an optoelectronic device, according to an example.

FIG. 3 is a block diagram depicting an optoelectronic device 300, according to an example. In one or more embodiments, optoelectronic device 300 is an example of at least portions of photonic communications system 100, optoelectronic device 200, or both. In one or more embodiments, the optoelectronic device 300 includes photonic circuitry 170 and electrical circuitry 250, which includes both electrical circuitry 180 and control circuitry 190. In one or more embodiments, one or more of the photonic circuitry 170, electrical circuitry 180, or control circuitry 190 are colocated (e.g., on a same integrated circuit with, or within a same integrated system or assembly). In other embodiments, one or more of the photonic circuitry 170, electrical circuitry 180, or control circuitry 190 are separate (e.g., on different integrated circuits, on different integrated systems or assemblies, or on different integrated circuits but within a same integrated system or assembly). In one or more embodiments, control circuitry 190 includes a communications interface 195 to send or receive signals as further described herein to one or more blocks or circuits of the optoelectronic device 300, including reference voltage control signal 324, TIA IDAC code 326, and/or the heater code 335.

Optoelectronic device 300 is a top-level diagram of a temperature tracking system. In one or more embodiments, electrical circuitry 250 includes transimpedance control circuitry 320, heater control circuitry 330, a capacitor flip-flop (CapFF) 340, a clock source 345 (e.g., an uncorrelated voltage-controlled oscillator (VCO) clock), a VDAC 350, a transimpedance amplifier (TIA) and IDAC 360, and a heater DAC 370.

The photonic circuitry 170 (e.g., a photonic integrated circuit (PIC)) is the optical block for which temperature tracking and wavelength locking is to be performed. The electrical circuitry 250 (e.g., an electrical integrated circuit (EIC)) includes an exemplary design that can wavelength lock an optical signal (e.g., a carrier wave of carrier waves 125) and track temperature variation. The heater 137 (e.g., a heater resistor $R_{heat}$) warms up the optical modulator device 138 (e.g., a MRM filter) to control the temperature, and thus the wavelength, of the optical modulator device 138. In one or more embodiments, the output DC current (e.g., $I_{PD}$) of the photodiode 133 is a function of the wavelength offset of the optical modulator device 138, transmitter modulation power, and laser input power. The output DC current (e.g., $I_{PD}$) of the photodiode 133 changes the TIA DC output 294 (e.g., an output voltage) of the TIA and IDAC 360, which is $V_{pd}$. A digital TIA DC loop including CapFF 340 (using the output of VDAC 350 that provides a reference voltage 355 ($V_{cm}$) based on a reference voltage control signal 324 (e.g., from the control circuitry 190, such as an 8-bit value specifying $V_{cm}$), and clocked according to clock source 345 and the system clock 322), transimpedance control circuitry 320, and TIA and IDAC 360 measures the photodiode voltage ($V_{pd}$) for photodiode 133 (TIA DC output 294), and adjusts the TIA IDAC code 326 (TIA_DAC_CTRL) to cancel the $I_{pd}$ to stabilize the TIA DC output voltage at the reference voltage $V_{cm}$. The TIA IDAC code reflects the value of $I_{PD}$, and thus the optical power that the photodiode 133 converts and the center wavelength of the optical modulator device 138 (e.g., MRM filter).

Based on the magnitude of $I_{PD}$ (TIA_DAC_CTRL) versus the heater code 335 (e.g., Therm_DAC_CTRL), the control circuitry 190 (e.g., heater control circuitry 330, which may also be or be referred to as heater RTL or heater DSP in some examples) determines (computes, calculates) the maximum power. The control circuitry 190 then parks (sets, controls) the wavelength of the optical modulator device 138 at a predetermined ratio, K, as further discussed above. The ratio, K, may also be referred to as a scaling value or scaling ratio herein. In one or more embodiments, the control circuitry 190 monitors the wavelength by the TIA IDAC code 326 (e.g., TIA_DAC_CTRL), and tunes the heater code 335 (e.g., Therm_DAC_CTRL) to lock the wavelength of the photonic circuitry 170 when the filter wavelength deviates due to temperature drift.

In one or more embodiments, optoelectronic device 300 includes a temperature controller circuit for maximizing an optical amplitude of an optical modulator device 138 (e.g., MRM). The TIA DC loop adjusts the TIA IDAC value to cancel the photo diode output DC current, $I_{PD}$, such that the TIA DC voltage is equal to the reference voltage $V_{cm}$. The PD output DC current, $I_{PD}$, is a function of the filter's wavelength offset $f_{os}$, the optical input power and the transmitter data pattern. During calibration, the control circuitry 190 (e.g., a TX heater DSP) sends a data pattern (e.g., a DC balanced data pattern such as 101010 . . . ) to avoid self-heating of the optical modulator device 138. The output current 296 from the heater DAC 370 (based on heater code 335 (e.g., Therm_DAC_CTRL)) controls the temperature of the optical modulator device 138 (e.g., ring filter), by controlling the heat (e.g., thermal energy) provided by heater 137, and thus the center wavelength of the optical modulator device 138. The control circuitry 190 sweeps the heater code 335 (e.g., Therm_DAC_CTRL) and observes the TIA IDAC code 326 (e.g., TIA_DAC_CTRL). The heater control circuitry 330 selects a heater code 335 such that the filter wavelength for optical modulator device 138 aligns or substantially aligns with the wanted incoming wavelength, for example at the beginning of link operation. The heater code 335 that is selected is corresponds to the maximum drop-port power, $P_d^{pk}$, at a drop-port (e.g., drop-port 132) of the optical modulator device 138. The control circuitry 190 (e.g., heater control circuitry 330) then determines (calculates, computes) the maximum OMA, which can be based on a given ratio, for examples from this power $K*P_d^{pk}$. Thereafter (e.g., after the initial calibration is done), the heater control circuitry 330 can monitor and calibrate the wavelength drift for the optical modulator device 138 due to temperature variation.

The operations of the photonic communications system 100, optoelectronic device 200, and/or optoelectronic device 300 include the following operations.

In one or more embodiments, a first operation includes the TIA DC loop (e.g., at least a loop including CapFF 340, transimpedance control circuitry 320, and TIA and IDAC 360) biases the TIA DC output 294 to $V_{pd}$ by tuning the TIA IDAC code 326, and the TIA IDAC code 326 represents DC power at the drop-port 132.

In one or more embodiments, a second operation includes, for each heater code 335 (e.g., Therm_DAC_CTRL), which may also be referred to as a thermal code, a corresponding TIA IDAC codes 326 is identified (e.g., by control circuitry 190, or a component thereof, such as processor 210, transimpedance control circuitry 320, and/or heater control circuitry 330). In one or more embodiments, control circuitry 190 continues a search for the maximum TIA IDAC code 326 for values of the heater code 335 within a given search range.

In one or more embodiments, a third operation includes control circuitry 190 identifying (finding) a filter center frequency for the filter (e.g., the optical modulator device 138) based on the maximum TIA IDAC code 326 representing (corresponding) to a maximum optical power at the drop-port 132.

In one or more embodiments, a fourth operation includes control circuitry 190 determining (calculate) a value for the TIA IDAC code 326 that is a ratio of the maximum value for the TIA IDAC code 326 (TIA_DAC_CTRL) followed by the heater code 335 (e.g., Therm_DAC_CTRL).

In one or more embodiments, a fifth operation includes performing (e.g., by control circuitry 190) continuous temperature tracking and wavelength locking by tuning the heater code 335 (e.g., a heater DAC code).

Figure 4:
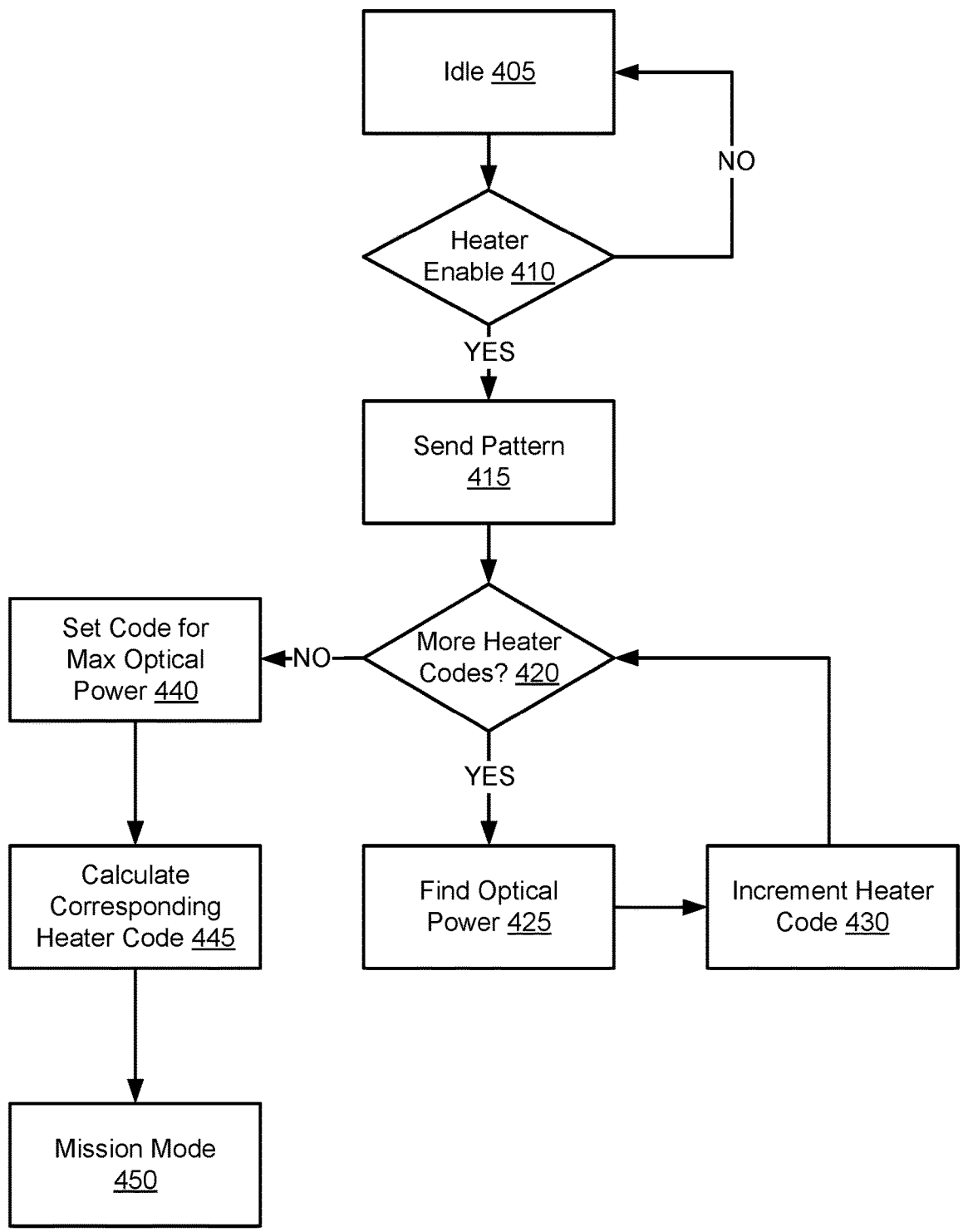
FIG. 4 is flow diagram of a method of operating an optoelectronic device, according to some examples.

FIG. 4 is flow diagram of a method 400 for operating an optoelectronic device, according to some examples. In one or more embodiments, the operations described with reference to method 400 are performed by one or more components of the photonic communications system 100, optoelectronic device 200, or optoelectronic device 300, such as control circuitry 190, processor 210, memory 220, support circuits 230, transimpedance control circuitry 320, and/or heater control circuitry 330.

In one or more embodiments, method 400 (process, algorithm, operations) includes multiple sets of operations (phases). For example, these operations can include at least a heater search range initialization and an OMA search At operation 405, the optoelectronic device is in an idle or sleep state.

At operation 410, the heater (e.g., including heater control circuitry 330) is enabled. In one or more embodiments, the heater IDAC (e.g., TIA and IDAC 360) has a relatively large tuning range. Therefore, the control circuitry 190 (heater control circuitry 330) limits the initial heater IDAC search range to about 200 GHz is given to find the filter peak, for example based on IDAC values versus heater code 335 (e.g., Therm_DAC_CTRL). In some examples, the filter center falls out of this range, so the filter may lock to its next wavelength. As a result, all the filters are shifted by one channel (carrier wave), and consumes additional power in some case (e.g., up to about 5 milliwatt per channel).

Therefore, the control circuitry 190 first detects if the TIA IDAC code at the beginning of the search range is above a threshold. If it is higher than the threshold, the control circuitry 190 decreases the upper and the lower end of the search range, until control circuitry 190 finds the TIA IDAC code is lower than the threshold. In some examples, this ensures that the initial point of the search range is at the left side of the center, so the filter center can always be covered.

During the filter initialization, the heater code 335 (e.g., Therm_DAC_CTRL) is swept from end to start (e.g., prog_heater_end and prog_heater_start) or start to end (e.g., prog_heater_start and prog_heater_end). If all the TIA IDAC is lower than the minimum threshold, a channel missing flag will be declared. Otherwise, the filter calibration will start.

At operation 415, a data pattern is sent to drive the optical modulator device 138. In some embodiments, the control circuitry 190 causes the optical modulator device 138 to be driven by the driver 135 according to a data pattern 485. In some embodiments, the data pattern 485 is a DC balance data pattern (10101 . . . ), which can prevent a self-heating effect on the optical modulator device 138. That is, sending the DC balance data pattern can cause the optical modulator block 131, including the optical modulator device 138, to have the same or about the same temperature when calibration is being performed as when actual data transmission is occurring (e.g., during the mission mode).

At operation 420, the control circuitry 190 determines whether there are more heater codes 335 (e.g., Therm_DAC_CTRL) in a range of heater codes 335 (e.g., Therm_DAC_CTRL) to be searched. Method 400 proceeds to operation 425 if there are more heater codes 335 to search (e.g., at the start of the search). Method 400 proceeds to operation 450 if there are no more heater codes 335 in the search range.

At operation 425, the control circuitry 190 (e.g., using heater control circuitry 330) sets a heater code 335 (e.g., Therm_DAC_CTRL), and the control circuitry 190 searches (e.g., using trans-impedance control circuitry 320) the corresponding digital representation IDAC for the heater code 335.

At operation 430, the control circuitry 190 (e.g., using heater control circuitry 330) increments the heater code 335, such that the heater DAC 370 supplies current to the heater 137 according to a different value, changing the temperature of the heater 137 and thus the optical modulator device 138 of the optical modulator block 131.

In one or more embodiments, control circuitry 190 can loop the operation 420, operation 425, and operation 430 until control circuitry 190 determines, at operation 420, that the end of the search range for the heater codes 335 has been reached. For example, the loop may continue until the minimum heater setting (prog_heater_start) is reached, for example where the maximum heater setting was the starting point (prog_heater_end).

At operation 440, the control circuitry 190 (e.g., using heater control circuitry 330) determines (finds, calculates, identifies) the corresponding value for TIA IDAC code 326 (e.g., TIA_DAC_CTRL) for the maximum optical power (e.g., IDAC_MAX), the control circuitry 190 (e.g., a TX DSP) determines (finds, calculates, identifies, looks up) the new value for TIA IDAC code 326 (e.g., TIA_DAC_CTRL) by multiplying the value for TIA IDAC code 326 that corresponds to the maximum optical power (e.g., IDAC_MAX) by a predetermined value (configured value, set value, calculated value, parameter). In one or more embodiments, the predetermined value is a programmable ratio, K, as further discussed herein.

At operation 445, the control circuitry 190 (e.g., using heater control circuitry 330) determines (finds, calculates, identifies, looks up) the heater code 335 (e.g., thermal DAC value) corresponding to the new value for TIA IDAC code 326 from operation 440.

At operation 450, the control circuitry 190 causes the optoelectronic device to enter a normal data transmission (mission) mode. For example, once the maximum OMA is obtained and heater incremented, control circuitry 190 asserts a calibration done signal so that the transmitter can be in a normal data transmission (mission) mode. In one or more embodiments, asserting the calibration done signal includes the control circuitry 190 signaling, via enable signal 390 (e.g., Cal_Enable), for the electrical circuitry 180 to select to obtain data 380 (e.g., rather than data patterns 385) for driver 135 to use to supply a drive signal 134 to the optical modulator device 138.

Figure 5:
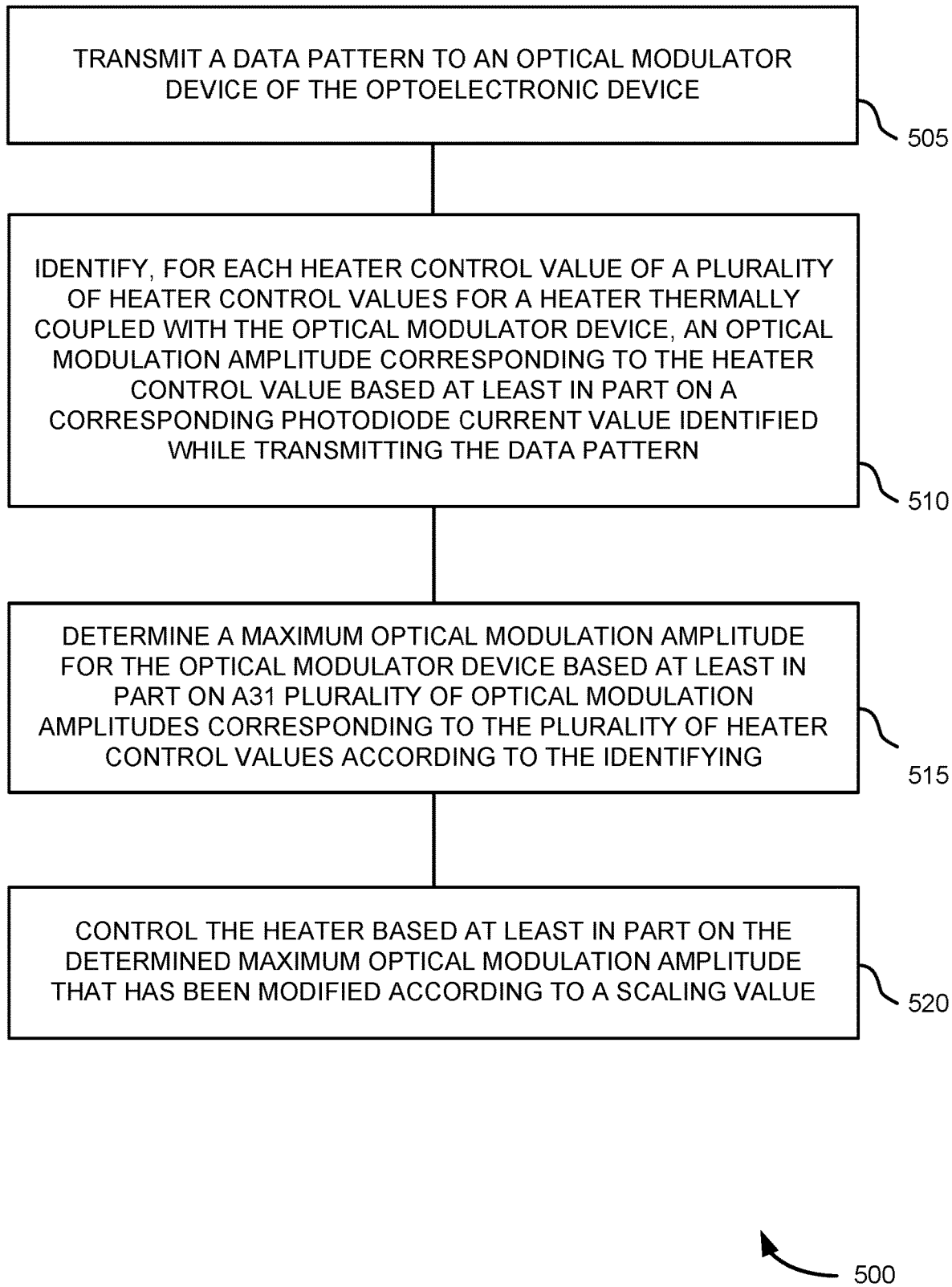
FIG. 5 is flow diagram of a method of operating an optoelectronic device, according to some examples.

FIG. 5 is flow diagram of a method 500 of operating an optoelectronic device, according to some examples. In one or more embodiments, the optoelectronic device is an example of at least portions of an optical modulator block 131 of a set of optical modulator blocks 130, and control circuitry 190.

At operation 505, the method includes transmitting a data pattern to an optical modulator device of the optoelectronic device.

At operation 510, the method includes identifying, for each heater control value of a plurality of heater control values for a heater thermally coupled with the optical modulator device, an optical modulation amplitude corresponding to the heater control value based at least in part on a corresponding photodiode current value identified while transmitting the data pattern.

At operation 515, the method includes determining a maximum optical modulation amplitude for the optical modulator device based at least in part on a plurality of optical modulation amplitudes corresponding to the plurality of heater control values according to the identifying.

At operation 520, the method includes controlling the heater based at least in part on the determined maximum optical modulation amplitude that has been modified according to a scaling value.

In one or more embodiments, the data pattern is a series of alternating "0" bits and "1" bits.

In one or more embodiments, the method further includes identifying that a first heater control value associated with a first photodiode current value in a range of heater control values exceeds a threshold value. The method then includes adjusting the range to determine the plurality of heater control values based at least in part on the range of the heater control values exceeding the threshold value.

In one or more embodiments, the method further includes determining, for each optical modulator device of a plurality of optical modulator devices, a maximum optical modulation amplitude for the optical modulator device, each optical modulator device of the plurality of optical modulator devices associated with a corresponding heater of a plurality of heaters. The method then includes controlling each heater of the plurality of heaters according to the determined maximum optical modulation amplitude that has been modified according to a scaling value for the optical modulator device corresponding to the heater.

In one or more embodiments, the scaling value for the optical modulator device is one of a plurality of scaling values associated with the plurality of optical modulator devices. In other embodiments, the scaling value for the optical modulator device is a same scaling value used for all of the plurality of optical modulator devices.

In one or more embodiments, the optical modulator device is a silicon micro-ring modulator. In one or more embodiments, the heater is controlled by a digital signal processor.

In one or more embodiments, two or more of operations 505 or 510 are substantially performed concurrently (simultaneously).

Figure 6:
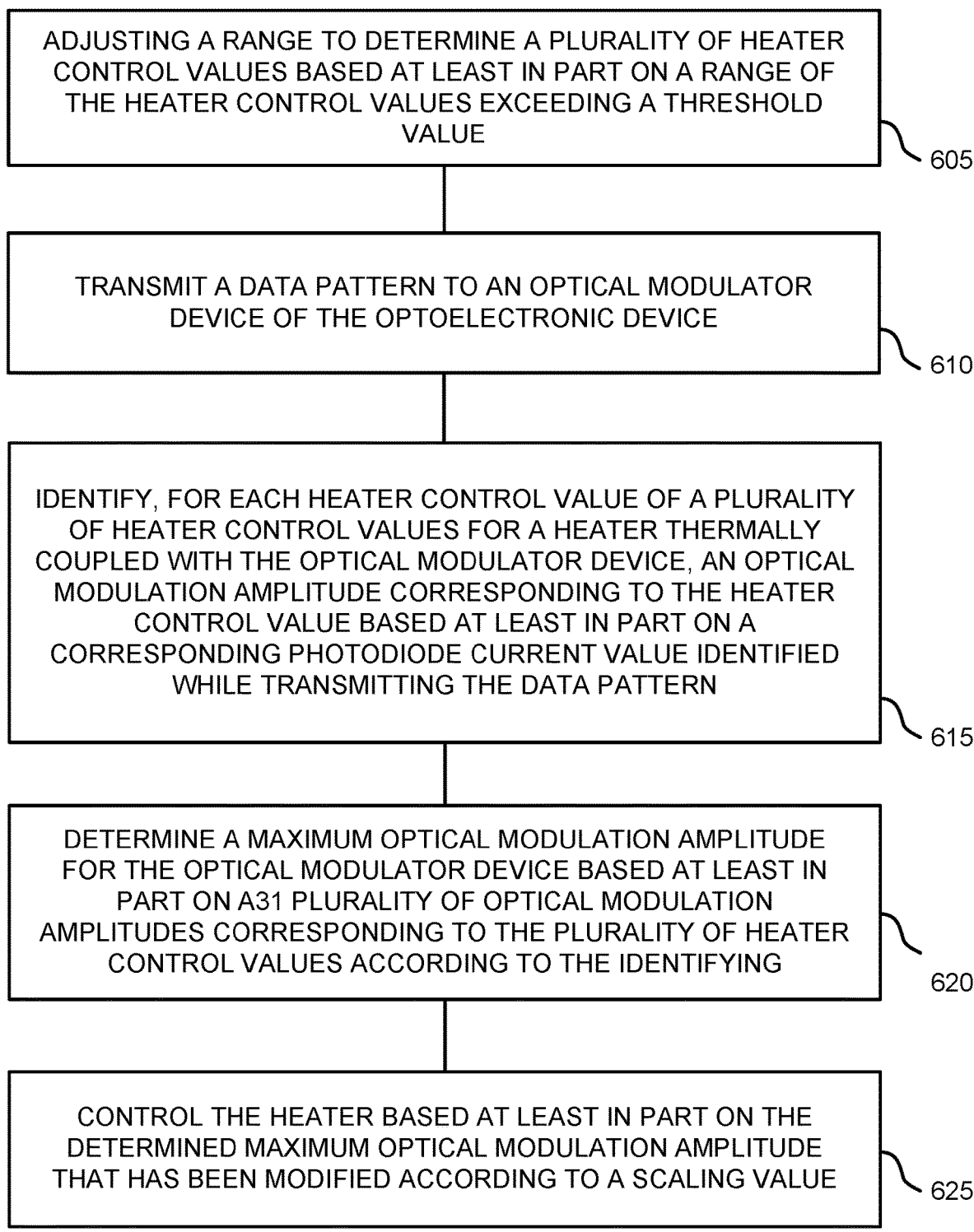
FIG. 6 is flow diagram of a method of operating an optoelectronic device, according to some examples.

FIG. 6 is flow diagram of a method 600 of operating an optoelectronic device, according to some examples. In one or more embodiments, the optoelectronic device is an example of at least portions of an optical modulator block 131 of a set of optical modulator blocks 130, and control circuitry 190.

At operation 605, the method includes adjusting a range to determine a plurality of heater control values based at least in part on a range of the heater control values exceeding a threshold value. In one or more embodiments, the method includes identifying that a first heater control value associated with a first photodiode current value in a range of heater control values exceeds a threshold value, and then adjusting the range to determine the plurality of heater control values based at least in part on the range of the heater control values exceeding the threshold value.

At operation 610, the method includes transmitting a data pattern to an optical modulator device of the optoelectronic device.

At operation 615, the method includes identifying, for each heater control value of a plurality of heater control values for a heater thermally coupled with the optical modulator device, an optical modulation amplitude corresponding to the heater control value based at least in part on a corresponding photodiode current value identified while transmitting the data pattern.

At operation 620, the method includes determining a maximum optical modulation amplitude for the optical modulator device based at least in part on a plurality of optical modulation amplitudes corresponding to the plurality of heater control values according to the identifying.

At operation 625, the method includes controlling the heater based at least in part on the determined maximum optical modulation amplitude that has been modified according to a scaling value.

In one or more embodiments, two or more of operations 610 or 615 are substantially performed concurrently (simultaneously). In one or more embodiments, operation 605 is performed after or substantially concurrently (simultaneously) with at least a portion of one or more of operations 610, 615, 620, or 625.

In one or more embodiments, one or more operations of method 500 may be combined with one or more operations of method 600.

While the foregoing is directed to specific examples, other and further examples may be devised without departing from the basic scope thereof, and the scope thereof is determined by the claims that follow.

What is claimed is:

1. A method of operating an optoelectronic device, comprising:
   transmitting a data pattern to an optical modulator device of the optoelectronic device;
   identifying, for each heater control value of a plurality of heater control values for a heater thermally coupled with the optical modulator device, an optical modulation amplitude corresponding to the heater control value based at least in part on a corresponding photodiode current value identified while transmitting the data pattern;
   determining a maximum optical modulation amplitude for the optical modulator device based at least in part on a plurality of optical modulation amplitudes corresponding to the plurality of heater control values according to the identifying; and
   controlling the heater based at least in part on the determined maximum optical modulation amplitude that has been modified according to a scaling value being one of a plurality of scaling values associated with a plurality of optical modulator devices.

2. The method of claim 1, wherein the data pattern comprises a series of alternating "0" bits and "1" bits.

3. The method of claim 1, further comprising:
   identifying that a first heater control value associated with a first photodiode current value in a range of heater control values exceeds a threshold value; and
   adjusting the range to determine the plurality of heater control values based at least in part on the range of the heater control values exceeding the threshold value.

4. The method of claim 1, further comprising:
   determining, for each optical modulator device of the plurality of optical modulator devices, a maximum optical modulation amplitude for the optical modulator device, each optical modulator device of the plurality of optical modulator devices associated with a corresponding heater of a plurality of heaters; and
   controlling each heater of the plurality of heaters according to the determined maximum optical modulation amplitude that has been modified according to a scaling value for the optical modulator device corresponding to the heater.

5. The method of claim 4, wherein an output optical signal for one or more of the plurality of optical modulator devices is configured to be increased by controlling its temperature and locking the output optical signal to the maximum optical modulation amplitude for each transmitter lane of an optical link.

6. The method of claim 4, wherein the scaling value for the optical modulator device is a same scaling value used for all of the plurality of optical modulator devices.

7. The method of claim 1, wherein the optical modulator device comprises a silicon micro-ring modulator.

8. The method of claim 1, wherein the heater is controlled by a digital signal processor.

9. An optoelectronic device, comprising:
   an optical modulator device;
   a heater thermally coupled with the optical modulator device;
   a photodiode associated with the optical modulator device; and
   control circuitry coupled with the heater and the photodiode, the control circuitry to:

transmit a data pattern to the optical modulator device;
identify, for each heater control value of a plurality of heater control values for the heater, an optical modulation amplitude corresponding to the heater control value based at least in part on a corresponding photodiode current value identified while transmitting the data pattern;
determine a maximum optical modulation amplitude for the optical modulator device based at least in part on a plurality of optical modulation amplitudes corresponding to the plurality of heater control values; and
control the heater based at least in part on the determined maximum optical modulation amplitude that has been modified according to a scaling value being one of a plurality of scaling values associated with a plurality of optical modulator devices.

10. The optoelectronic device of claim 9, wherein the data pattern comprises a series of alternating "0" bits and "1" bits.

11. The optoelectronic device of claim 9, wherein the control circuitry is further configured to:
identify that a first heater control value associated with a first photodiode current value in a range of heater control values exceeds a threshold value; and
adjust the range to determine the plurality of heater control values based at least in part on the range of the heater control values exceeding the threshold value.

12. The optoelectronic device of claim 9, further comprising:
a plurality of heaters, each optical modulator device of the plurality of optical modulator devices associated with a corresponding heater of the plurality of heaters,
wherein the control circuitry is further to:
determine, for each optical modulator device of the plurality of optical modulator devices, a maximum optical modulation amplitude for the optical modulator device; and
control each heater of the plurality of heaters according to the determined maximum optical modulation amplitude that has been modified according to a scaling value for the optical modulator device corresponding to the heater.

13. The optoelectronic device of claim 12, wherein an output optical signal for one or more of the plurality of optical modulator devices is configured to be increased by controlling its temperature and locking the output optical signal to the maximum optical modulation amplitude for each transmitter lane of an optical link.

14. The optoelectronic device of claim 12, wherein the scaling value for the optical modulator device is a same scaling value used for all of the plurality of optical modulator devices.

15. An integrated circuit device, comprising:
a communications interface to couple the integrated circuit device with an optical modulator device, a heater, and a photodiode; and
control circuitry coupled with the communications interface to:
transmit a data pattern to the optical modulator device via the communications interface;
identify, for each heater control value of a plurality of heater control values for the heater, an optical modulation amplitude corresponding to the heater control value based at least in part on a corresponding photodiode current value identified while transmitting the data pattern;
determine a maximum optical modulation amplitude for the optical modulator device based at least in part on a plurality of optical modulation amplitudes corresponding to the plurality of heater control values; and
control, via the communications interface, the heater based at least in part on the determined maximum optical modulation amplitude that has been modified according to a scaling value being one of a plurality of scaling values associated with a plurality of optical modulator devices.

16. The integrated circuit device of claim 15, wherein the data pattern comprises a series of alternating "0" bits and "1" bits.

17. The integrated circuit device of claim 15, wherein the control circuitry is further configured to:
identify that a first heater control value associated with a first photodiode current value in a range of heater control values exceeds a threshold value; and
adjust the range to determine the plurality of heater control values based at least in part on the range of the heater control values exceeding the threshold value.

18. The integrated circuit device of claim 15, further comprising:
a plurality of heaters, each optical modulator device of the plurality of optical modulator devices associated with a corresponding heater of the plurality of heaters,
wherein the control circuitry is further to:
determine, for each optical modulator device of the plurality of optical modulator devices, a maximum optical modulation amplitude for the optical modulator device; and
control, via the communications interface, each heater of the plurality of heaters according to the determined maximum optical modulation amplitude that has been modified according to a scaling value for the optical modulator device corresponding to the heater.

19. The integrated circuit device of claim 18, wherein an output optical signal for one or more of the plurality of optical modulator devices is configured to be increased by controlling its temperature and locking the output optical signal to the maximum optical modulation amplitude for each transmitter lane of an optical link.

20. The integrated circuit device of claim 18, wherein the scaling value for the optical modulator device is a same scaling value used for all of the plurality of optical modulator devices.

* * * * *